United States Patent [19]

D'Agostino et al.

[11] Patent Number: 5,100,099

[45] Date of Patent: Mar. 31, 1992

[54] BALL-TYPE SEALING DEVICE

[75] Inventors: Guy D'Agostino, Vitry; Alain Tiepel, Chailly en Biere, both of France

[73] Assignee: Societe Nationale d'Etude et de Construction de Moteurs d'Aviation (SNECMA), Pair, France

[21] Appl. No.: 714,825

[22] Filed: Jun. 13, 1991

[30] Foreign Application Priority Data

Jun. 14, 1990 [FR] France ............... 90 07436

[51] Int. Cl.⁵ ................................ F16K 25/00
[52] U.S. Cl. ..................... 251/86; 137/901
[58] Field of Search .............. 137/901; 251/84, 85, 251/86, 88, 334

[56] References Cited

U.S. PATENT DOCUMENTS

| 123,031 | 1/1872 | Maclaren | 137/901 |
|---|---|---|---|
| 1,409,127 | 3/1922 | Wasem | 251/86 |
| 1,763,927 | 6/1930 | Ireland | 251/86 |
| 2,352,249 | 6/1944 | Briggs, Jr. | 251/88 |
| 3,117,762 | 1/1964 | Bartlett | 251/88 |
| 3,491,789 | 1/1970 | Callahan, Jr. et al. | 251/88 |
| 3,529,805 | 9/1970 | Callahan, Jr. et al. | 251/88 |
| 3,601,362 | 8/1971 | Gunther | 251/88 |
| 3,761,053 | 9/1973 | Bedo et al. | 251/88 |
| 4,273,614 | 6/1981 | Pomie et al. | 176/30 |
| 4,343,331 | 8/1982 | Tersteegen | 137/901 |
| 4,541,607 | 9/1985 | Hotger | 137/901 |

FOREIGN PATENT DOCUMENTS

| 3431813 | 3/1986 | Fed. Rep. of Germany . |
|---|---|---|
| 767915 | 7/1934 | France . |
| 1123507 | 1/1955 | France . |
| 1403154 | 3/1964 | France . |
| 1445239 | 4/1965 | France . |
| 1505399 | 9/1966 | France . |

Primary Examiner—George L. Walton
Attorney, Agent, or Firm—Bacon & Thomas

[57] ABSTRACT

A ball-type sealing device is disclosed for preventing fluid flow out of an orifice wherein the sealing ball is mounted in a body member so as to have both radial or transverse and axial degrees of freedom. The sealing ball, which has a diameter greater than that of the orifice, is mounted in a chamber defined by the body member such that a portion of the ball extends through an aperture in the end of the chamber to the exterior of the body member. The sealing ball is positioned by a pushrod slidably extending into an elongated hole defined by the body member such that one end of the pushrod, having a first contact surface $S_1$, is in contact with the sealing ball. The opposite end of the pushrod is associated with a second contact surface $S_2$ which has an area smaller than the contact surface $S_1$. The sealing ball may be accurately placed in the orifice to be sealed since it has both a transverse degree of freedom, due to the diameter of the chamber in the body member being larger than the diameter of the sealing ball, as well as an axial degree of freedom. Pressure exerted on the sealing ball along the longitudinal axis of the body member exerts a force on the pushrod which, in turn, causes permanent axial deformation of a crush portion of the body member adjacent to the second end of the pushrod. This deformation provides the necessary axial play or clearance between the pushor and the ball.

3 Claims, 1 Drawing Sheet

BALL-TYPE SEALING DEVICE

BACKGROUND OF THE INVENTION

The present invention relates to a device for sealing an orifice wherein a ball-type sealing device is urged against the orifice with a specific force. The invention finds use in hydraulic, pneumatic, or mechanical thrust devices or pistons.

In order to establish complete sealing for mechanical devices such as pushrods, pistons, valves, etc., semi-permanent or intermittent but complete contact must be established at the opening of a cylindrical orifice. To achieve such complete sealing, known elements were machined with high accuracy to provide an accurate fit between the elements. However, such known machinery elements were subject to deviation from the desired dimensions and were quite costly to manufacture.

Another solution to provide complete sealing is to seal the orifice with an element having one or more degrees of freedom. This enables the sealing element to match the corresponding part, such as the structure defining the end of the orifice being sealed, so as to assure permanent and tight contact. If the sealing element were crudely placed opposite the orifice to be sealed, it would not necessarily be centered with respect to the orifice unless the sealing part were also able to enjoy at least one degree of freedom relative to the axis of the orifice. However, in the known devices, asymmetry of the applied stresses by the sealing part may cause lack of homogeneity in the sealing of the orifice.

SUMMARY OF THE INVENTION

A ball-type sealing device is disclosed for preventing fluid flow out of an orifice wherein the sealing ball is mounted in a body member so as to have both radial or transverse and axial degrees of freedom. The sealing ball, which has a diameter greater than that of the orifice, is mounted in a chamber defined by the body member such that a portion of the ball extends through an aperture in the end of the chamber to the exterior of the body member.

The sealing ball is positioned by a pushrod slidably extending into an elongated hole defined by the body member such that one end of the pushrod, having a first contact surface $S_1$, is in contact with the sealing ball. The opposite end of the pushrod is associated with a second contact surface $S_2$ which has an area smaller than the contact surface $S_1$.

The sealing ball may be accurately placed in the orifice to be sealed since it has both a transverse degree of freedom, due to the diameter of the chamber in the body member being larger than the diameter of the sealing ball, as well as an axial degree of freedom. Pressure exerted on the sealing ball along the longitudinal axis of the body member exerts a force on the pushrod which, in turn, causes permanent axial deformation of a crush portion of the body member adjacent to the second end of the pushrod. This deformation provides the necessary axial play or clearance between the pushrod and the ball. Due to both the radial or transverse and the axial degrees of freedom of the sealing ball, it may accurately center itself on the orifice to effect a complete sealing without the exertion of undue stresses on the orifice structure, and without the necessity of highly accurate and costly machining operations.

DETAILED DESCRIPTION OF THE PREFERRED EMBODIMENT

Figure 1:
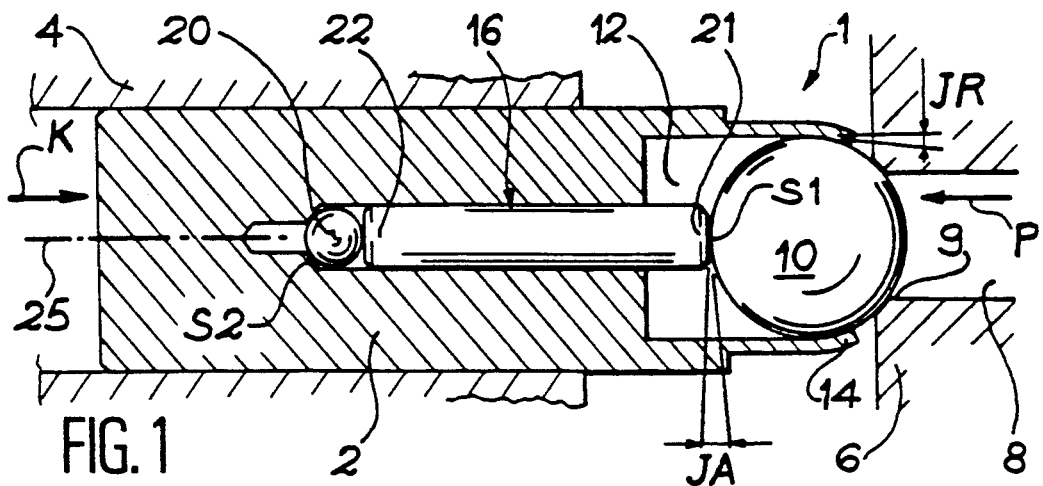
FIG. 1 is a longitudinal, cross-sectional view of the ball-type sealing device according to the present invention before the axial play or clearance has been established.

As best illustrated in FIG. 1, the ball-type sealing device 1 of the invention is located in a support 4, which may be any means to position the sealing device of this invention relative to orifice 8 defined in pneumatic or hydraulic member 6.

The sealing member comprises a generally spherical sealing ball 10 having a diameter $D_{10}$, which is applied against the end 9 of the orifice 8 in order to seal the orifice to prevent the flow of fluid therethrough. The end 9 of the orifice 8 has a diameter $D_9$ which is less than the diameter $D_{10}$ of the sealing ball 10. The sealing ball 10 is positioned by a body member 2 which urges the ball against the orifice 8 to be sealed. The sealing ball 10 is located within an inner chamber 12 defined by the body member 2, the inner chamber 12 having a generally cylindrical configuration extending along the longitudinal axis 25 of the body member 2. The ends 14 of the body member 2 defining the inner chamber 12 are slightly inwardly deformed or crimped so as to prevent the sealing ball from escaping from the chamber 12. This end of the body member defines an aperture and, as can be clearly seen in the figures, a portion of the sealing ball 10 extends through this aperture exteriorly of the body member 2. It is this exterior portion that is urged against the opening of orifice 8 to effect the seal.

Body member 2 is slidably mounted in support 4 such that a force K, illustrated in FIG. 1, applied to the body 2 is transferred to the sealing ball 10 so as to urge it against the orifice 8. Force K may, of course, be generated by pneumatic, hydraulic or mechanical means.

In order to establish complete, hermetic sealing of the end 9 of the orifice 8, the sealing ball 10 must have at least one operational degree of freedom. If the body member 2 positioned by the support 4 were to place the sealing ball 10 against the orifice 8 such that it was non-axially located, then the sealing ball 10 could not hermetically seal the orifice 8. In that particular instance, the sealing ball 10 would rest only on a portion of the circumference of the end 9 of the orifice 8. Thus, the sealing ball would be asymmetrically forced against the structure defining the orifice 8 resulting in premature and asymmetric wear of the sealing ball. Experience has shown, therefore, that a radial or a transverse clearance between the sealing ball 10 and the part with which it is associated is required in the event that body member 2 and the orifice 8 are offset so that the sealing ball can center itself in the orifice 8.

In addition, an axial play or clearance is required to keep the sealing ball 10 in position by means of the crimped ends 14. In the present invention, the axial play or clearance is independent of the radial or transverse play or clearance such that both can be adjusted autonomously during the operation of the sealing device. The axial play or clearance is achieved by means of a pushrod 16 which is slidably received in an elongated opening 26 defined by the body member 2. The pushrod has a first end 21 defining a first contact surface $S_1$ which is in contact with the sealing ball 10. A second end 22 of the pushrod 16 is operatively associated with a crush portion of the body 2 having a second contact surface $S_2$ of much lesser area than that of first contact surface $S_1$. As a result, a pressure P applied against the sealing ball 10 by fluid in the orifice 8 will transmit a force F to the pushrod 16 through the sealing ball 10. Force F is proportional to the pressure P times the area of first contact surface $S_1$. Force F is then transmitted to the crush portion of the body member 2 and will exert a pressure thereon $P_2$ which is equal force F divided by the area of the second contact surface $S_2$. Quite obviously, the force transmitted to the crush portion will vary as the ratio $S_1/S_2$.

Due to the force F, the crush portion may undergo a permanent deformation caused by the pressure on the sealing ball 10. The permanent deformation may be controlled and predetermined so as to control, in turn, the penetration of the pushrod 16 into the crush portion of the body member 2. In this manner, the axial play or clearance $J_A$ of the sealing ball 10 inside the chamber 12 can be set in a specified manner.

Figure 2:
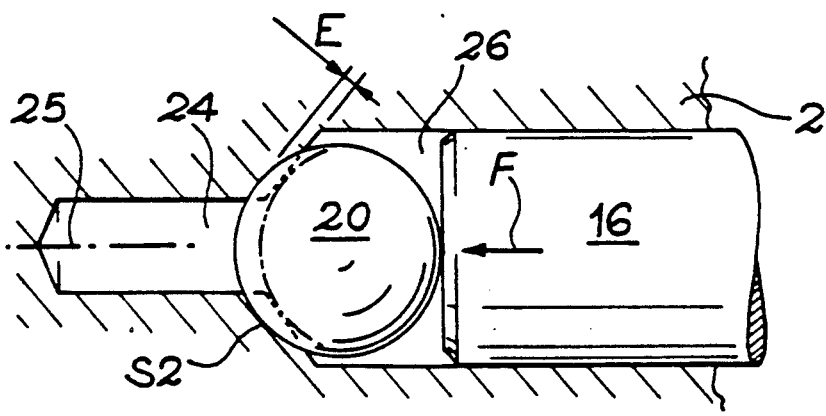
FIG. 2 is a partial, enlarged, cross-sectional view of the invention illustrated in FIG. 1 showing the system for implementing the axial clearance or play.

In the embodiment illustrated in FIGS. 1 and 2, the second end 22 of the pushrod 16 does not directly act on the crush portion of the body member 2. An intermediate deforming ball 20 is operatively interposed between the second end 22 of the pushrod 16 and the second contact surface $S_2$ of the body member 2.

As best seen in FIG. 2, the contact surface $S_2$ is defined between the diameter of elongated opening 26 and a further extended opening 24 which extends along longitudinal axis 25. Thus, the second contact surface $S_2$ consists of an annulus which rests against the deforming ball 20.

In FIG. 2, the deforming ball 20 is illustrated in solid lines in its position following the deformation of the crush portion of the body member 2. Accordingly, the second contact surface $S_2$ assumes the shape of a spherical annulus in the body member 2. The deformation or crushing E caused by the deforming ball 20 of the body member 2 depends upon the force F exerted thereon by the second end 22 of pushrod 16. The axial play or clearance $J_A$ is proportional to this crushing or deformation E as a function of the angle between the second contact surface $S_2$ and the longitudinal axis 25 on which the deforming ball 20 is located and which also constitutes the axis of the elongated hole 26.

Figure 3:
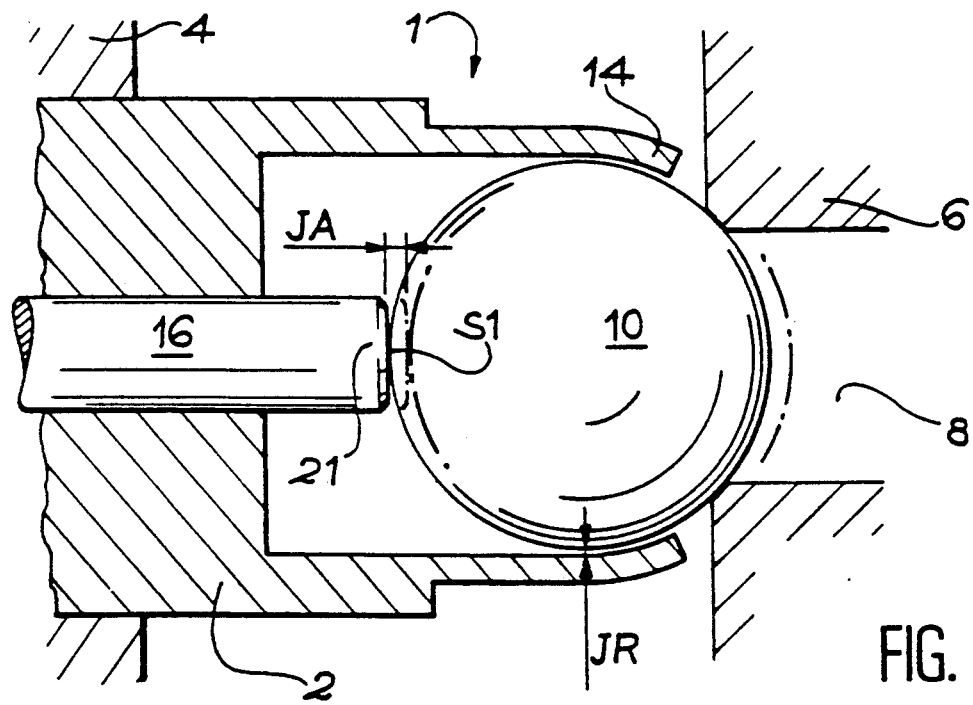
FIG. 3 is an enlarged, partial, cross-sectional view of the invention after the axial play or clearance has been established.

In FIG. 3, the axial play or clearance $J_A$ is shown near the first contact surface $S_1$. The axial play or clearnce $J_A$ was achieved by a thrust on the sealing ball 10 once it had been put in place within the inner chamber 12 and after the radial play or clearance $J_R$ was set. It is mandatory to first adjust the radial play or clearance $J_R$ by milling or otherwise forming the internal chamber 12 to a diameter $D_{12}$ which is slightly larger than the diameter $D_{10}$ of the sealing ball 10. Thus, the radial play or clearance $J_R$ is established by the difference between $D_{12}$ and $D_{10}$.

Once the sealing ball 10 has been introduced into the inner chamber 12, the end 14 of the body member 2 is slightly crimped so as to create an aperture having a diameter of $D_0$ which is less than the diameter $D_{10}$ of the sealing ball so as to retain the sealing ball in the inner chamber 12. At this point, the ball is in the position shown by dashed lines in FIG. 3. The axial play $J_A$ can then be established as discussed above, by applying a specified pressure against the sealing ball 10 so as to cause permanent deformation of the crush portion of the body member 2. Once this has been accomplished, the sealing device has a sealing ball which has both radial or transverse, as well as axial degrees of freedom.

Accordingly, the magnitude of the axial play $J_A$ depends upon the following parameters:
  a) the pressure P exerted on the sealing ball 10;
  b) the area of the first contact surface $S_1$;
  c) the area of the second contact surface $S_2$;
  d) the eccentricity of the second contact surface $S_2$; and
  e) the respective hardnesses of the sealing ball 10, the pushrod 16, the deforming ball 20 and the body member 2.

Clearly, the independent establishment of the radial or transverse play $J_R$ and the axial play or clearance $J_A$ allows the sealing device to be used in many varieties of operations, each of which may require different operational parameters. Regardless of the operating parameters, the contact between the sealing ball 10 and the end 9 of the orifice 8 will be optimal resulting in zero lateral or transverse stresses at the contact area.

The foregoing description is provided for illustrative purposes only and should not be construed as in any way limiting this invention, the scope of which is defined solely by the appended claims.

We claim:

1. A ball-type sealing device for preventing fluid flow out of an orifice having a diameter $D_9$ comprising:
  a) a body member having a longitudinal axis and defining an inner chamber with an end portion defining an aperature communicating with the inner chamber, the chamber having a generally cylindrical configuration extending along the longitudinal axis with a transverse diameter $D_{12}$.
  b) a sealing ball operatively retained in the inner chamber, the sealing ball having a substantially spherical shape with a diameter $D_{10}$ such that $D_{10} > D_9$ and such that $D_{10} < D_{12}$, so as to define a radial clearance between the sealing ball and the body member thereby permitting relative transverse movement between the sealing ball and the body member; and,
  c) means positioning the sealing ball such that a portion of the sealing ball extends through the aperture exteriorly of the body member to seal the orifice and permitting movement of the sealing ball relative to the body member in both a radial direction generally transverse to the longitudinal axis of the body member and an axial direction generally parallel to the longitudinal axis, the means comprising:
   i) a pushrod slidably received in an elongated hole defined by the body member, the pushrod having a first end defining a first contact surface $S_1$ in contact with the sealing ball and a second end; and,
   ii) a crush portion defined by the body member in operative association with the second end of the pushrod, the crush portion having a second contact surface $S_2$ having an area smaller than the first contact surface $S_1$ such that a predetermined pressure exerted on the sealing ball causes permanent axial deformation of the crush portion to establish an axial operational clearance.

2. The ball-type sealing service of claim 1 further comprising a deforming ball operatively interposed between the crush portion and the second end of the pushrod.

3. The ball-type sealing device of claim 2 wherein the second contact surface has an annular configuration.

* * * * *